(12) United States Patent
Wang et al.

(10) Patent No.: US 12,163,000 B2
(45) Date of Patent: Dec. 10, 2024

(54) VIBRATING DIAPHRAGM OF SOUND-PRODUCING APPARATUS AND SOUND-PRODUCING APPARATUS

(71) Applicant: Goertek Inc., Shandong (CN)

(72) Inventors: Shuqiang Wang, Weifang (CN); Fengguang Ling, Weifang (CN); Chun Li, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 7 days.

(21) Appl. No.: 17/767,745

(22) PCT Filed: Dec. 25, 2019

(86) PCT No.: PCT/CN2019/128169
§ 371 (c)(1),
(2) Date: Apr. 8, 2022

(87) PCT Pub. No.: WO2021/082251
PCT Pub. Date: May 6, 2021

(65) Prior Publication Data
US 2024/0101768 A1    Mar. 28, 2024

(30) Foreign Application Priority Data

Oct. 31, 2019    (CN) .......................... 201911056649.4

(51) Int. Cl.
*C08J 5/18*        (2006.01)
*H04R 7/10*       (2006.01)
(Continued)

(52) U.S. Cl.
CPC ................. *C08J 5/18* (2013.01); *H04R 7/10* (2013.01); *H04R 9/025* (2013.01); *H04R 9/06* (2013.01);
(Continued)

(58) Field of Classification Search
CPC ...... C08J 5/18; C08J 2375/06; C08J 2375/08; H04R 7/10; H04R 9/025; H04R 9/06;
(Continued)

(56) References Cited

U.S. PATENT DOCUMENTS

2019/0125029 A1\* 5/2019 Edwards ................ A43B 5/185

FOREIGN PATENT DOCUMENTS

| CN | 106450441 A | \* | 2/2017 | ........ H01M 10/0525 |
| CN | 107488334 A | \* | 12/2017 | ............. C08G 18/10 |

(Continued)

*Primary Examiner* — Angelica M McKinney
(74) *Attorney, Agent, or Firm* — Baker Botts LLP

(57) ABSTRACT

Disclosed are a vibrating diaphragm of a sound-producing apparatus and the sound-producing apparatus. The vibrating diaphragm includes a polyurethane rubber film layer and the polyurethane rubber film layer includes a block polymer formed by soft segment portions and hard segment portions that are arranged alternately, wherein each of the soft segment portions includes polyhydric alcohol and each of the hard segment portions includes isocyanate and a chain extender, and the polyurethane rubber is represented by a structural formula as follows:

$$\{\overset{O}{\overset{\|}{C}}-NH-R-NH-\overset{O}{\overset{\|}{C}}-O-R_1-O\}_n$$

wherein R is the chain extender, $R_1$ is polyhydric alcohol and n is a natural number. (FIG. 6).

14 Claims, 4 Drawing Sheets

(51) Int. Cl.
    *H04R 9/02*       (2006.01)
    *H04R 9/06*       (2006.01)
    *H04R 31/00*     (2006.01)

(52) U.S. Cl.
    CPC ........ *C08J 2375/06* (2013.01); *C08J 2375/08* (2013.01); *H04R 31/003* (2013.01); *H04R 2307/025* (2013.01)

(58) Field of Classification Search
    CPC ...................... H04R 31/003; H04R 2307/025; A43B 5/185; C08G 18/10; H01M 10/0525
    See application file for complete search history.

(56) References Cited

FOREIGN PATENT DOCUMENTS

| | | | |
|---|---|---|---|
| CN | 207053754 U | 2/2018 | |
| CN | 207802347 U | 8/2018 | |
| CN | 108976763 A | * 12/2018 | ............. C08G 18/10 |

\* cited by examiner

VIBRATING DIAPHRAGM OF SOUND-PRODUCING APPARATUS AND SOUND-PRODUCING APPARATUS

CROSS-REFERENCE TO RELATED APPLICATIONS

This application is a National Stage of International Application No. PCT/CN2019/128169, filed on Dec. 25, 2019, which claims priority to Chinese Patent Application No. 201911056649.4, filed on Oct. 31, 2019, both of which are hereby incorporated by reference in their entireties.

TECHNICAL FIELD

The present disclosure relates to the technical field of electroacoustic conversion, in particular to a vibrating diaphragm of a sound-producing apparatus and the sound-producing apparatus.

BACKGROUND

Most existing vibrating diaphragms for miniature speakers use engineering plastics with high modulus (e.g. PEEK) as the raw material thereof. Furthermore, the vibrating diaphragm is a composite material of an engineering plastic thin film and a damping adhesive film (for example, an acrylic adhesive, silica gel and the like). To form a predetermined corrugated rim structure, it is often necessary to use post-heating forming processes such as hot pressing or air pressing for the vibrating diaphragm. The corrugated rim structure is used for providing compliance of the vibrating diaphragm, such that the vibration condition of the vibrating diaphragm may be adjusted.

An existing high molecular vibrating diaphragm formed in a predetermined shape may have a better vibration condition within a certain vibration range. Due to large crosslinking density of engineering plastics, although its elastic modulus is high, it is easy to cause yield strain under relatively low strain. When the vibrating diaphragm vibrates in excessive amplitude or is subjected to an external force, it is extremely easy for the corrugated rim of the vibrating diaphragm to bend irreversibly, thereby changing symmetry of compliance of the vibrating diaphragm and causing abnormal sound-producing or even total failure of the speaker.

Thus, it is necessary to provide a novel technical solution to solve at least one of the above technical problems.

SUMMARY

An object of the present disclosure is to provide a novel technical scheme of a vibrating diaphragm of a sound-producing apparatus and the sound-producing apparatus.

According to a first aspect of the present disclosure, a vibrating diaphragm of a sound-producing apparatus is provided. The vibrating diaphragm includes a polyurethane rubber film layer, and the polyurethane rubber includes a block polymer formed by arranging soft segment portions and hard segment portions alternately, wherein each of the soft segment portions includes polyhydric alcohol and each of the hard segment portions includes isocyanate and a chain extender, and the polyurethane rubber is represented by a structural formula as follows:

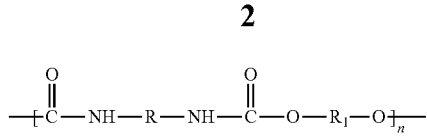

Wherein R is a chain extender, $R_1$ is polyhydric alcohol and n is a natural number.

Optionally, the isocyanate is at least one of diisocyanate and polyisocyanate.

Optionally, the isocyanate includes at least one of TDI, MDI, HDI. NDI, PPDI, IPDI, XDI, PADI, HTDI and HMDI.

Optionally, the chain extender includes at least one of an alcohol compound and an amine compound.

Optionally, the chain extender includes at least one of ethylene glycol, diethylene glycol, 1,2-propylene glycol, dipropylene glycol, 1,4-butanediol, 1,6-hexanediol and trimethylolpropane.

Optionally, the soft segment portion includes at least one of polyester polyol, polyether polyol, polybutadiene polyol, castor oil polyol, tetrahydrofuran-propylene oxide polyol and epoxy resin modified polyol.

Optionally, the polyurethane rubber further includes a vulcanizer, and the vulcanizer is at least one of sulfur, peroxide and isocyanate.

Optionally, the polyurethane rubber further includes a reinforcing agent, and the reinforcing agent includes at least one of carbon black, silicon dioxide, calcium carbonate, barium sulfate, organic montmorillonite and unsaturated metal carboxylates.

Optionally, the polyurethane rubber further includes an antiaging agent, and the antiaging agent includes at least one of antiaging agent N-445, antiaging agent 246, antiaging agent 4010, antiaging agent SP, antiaging agent RD, antiaging agent ODA, antiaging agent OD and antiaging agent WH-02.

Optionally, a hardness of the polyurethane rubber is 20 A to 90 A and a room temperature storage modulus is 0.5 MPa to 70 MPa.

Optionally, a brittle temperature of the polyurethane rubber ranges from −70° C. to −20° C., and a loss factor of the polyurethane rubber is greater than or equal to 0.06.

Optionally, a thickness of the vibrating diaphragm is 20 μm to 50 μm, and an elongation at break of the vibrating diaphragm is greater than or equal to 100%.

Optionally, a mass content of the hard segment portion in the polyurethane rubber is 2% to 50%.

According to an embodiment of the present disclosure, provided is a sound-producing apparatus. The sound-producing apparatus includes a magnetic circuit system and a vibrating system matched with the magnetic circuit system, the vibrating system including the above vibrating diaphragm.

According to an embodiment of the present disclosure, the soft segment portion is composed of a flexible long chain of an oligomer polyhydric alcohol. The soft segment portion can provide flexibility and rebound resilience for polyurethane rubber. The hard segment portion can provide hardness and rigidity for polyurethane rubber.

In addition, as the molecular chain of the polyurethane rubber is composed of the hard segment portion and the soft segment portion, the steric hindrance thereof is relatively large when the molecular chain slides, and thus the polyurethane rubber further has proper damping properties. The vibrating diaphragm can effectively reduce noise of the sound-producing apparatus.

The vibrating diaphragm made of the polyurethane rubber not only has a resilient property more excellent than that of the vibrating diaphragm made of engineering plastic, but also has relatively low distortion.

Other features and advantages of the present disclosure will be readily apparent from the following detailed description of exemplary embodiments of the present disclosure with reference to the drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

DETAILED DESCRIPTION

Figure 1:
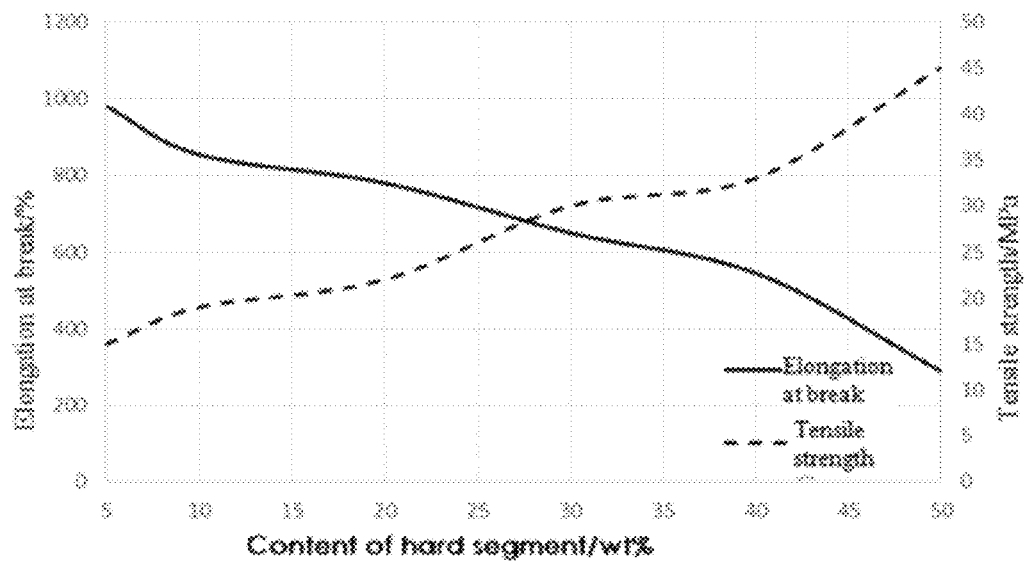
FIG. 1 is a variation curve of an elongation at break and tensile strength of the polyurethane rubber as a function of a mass content of a hard segment portion according to an embodiment of the present disclosure.

Detail description on the various exemplary embodiments of the present disclosure will be made below with reference to the drawings. It is to be noted that unless otherwise specified, relative arrangement, digital expression formulae and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

According to an embodiment of the present disclosure, provided is a vibrating diaphragm of a sound-producing apparatus. The sound-producing apparatus can be, but not limited to, a miniature speaker, a horn apparatus and etc.

The vibrating diaphragm includes a polyurethane rubber film layer. The polyurethane rubber film layer includes a block polymer formed by arranging soft segment portions and hard segment portions alternately. The block polymer refers to a polymer formed by connecting together two or more polymer chain segments with different properties. The polymer can have chain segments of different properties. Each of the soft segment portions includes a polyhydric alcohol and each of the hard segment portions includes isocyanate and a chain extender, and the polyurethane rubber is represented by a structural formula as follows:

$$-\left[\overset{O}{\underset{\|}{C}}-NH-R-NH-\overset{O}{\underset{\|}{C}}-O-R_1-O\right]_n-$$

Wherein R is the chain extender, $R_1$ is polyhydric alcohol and n is a natural number.

Based on the above structural formula, the hard segment portion formed by isocyanate and the chain extender is represented by the general formula below:

$$-\overset{O}{\underset{\|}{C}}-\underset{|}{N}-R-\underset{|}{N}-\overset{O}{\underset{\|}{C}}-$$

Wherein R is the chain extender.

The soft segment portion formed by polyhydric alcohol is represented by the general formula below:

—O—$R_1$—O—

Wherein $R_1$ is polyhydric alcohol.

For example, the vibrating diaphragm is a single-layered vibrating diaphragm. The film layer is made of polyurethane rubber.

Further, the vibrating diaphragm is a composite vibrating diaphragm. The composite vibrating diaphragm includes a plurality of film layers, for example, two, three, four, five film layers and etc. At least one film layer is made of polyurethane rubber, that is, a polyurethane rubber film layer.

Figure 6:
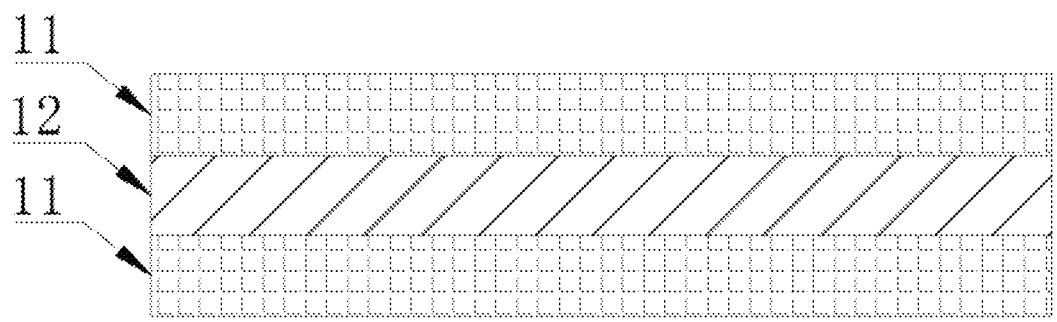
FIGS. 6 and 7 are cross-sectional views of a composite vibrating diaphragm according to an embodiment of the present disclosure.

FIG. 6 shows a three-layered composite vibrating diaphragm, wherein a middle layer is a polyurethane rubber film layer 12, and upper and lower surfaces of the polyurethane rubber film layer are combined with engineering plastic film layers 11 respectively.

Figure 7:
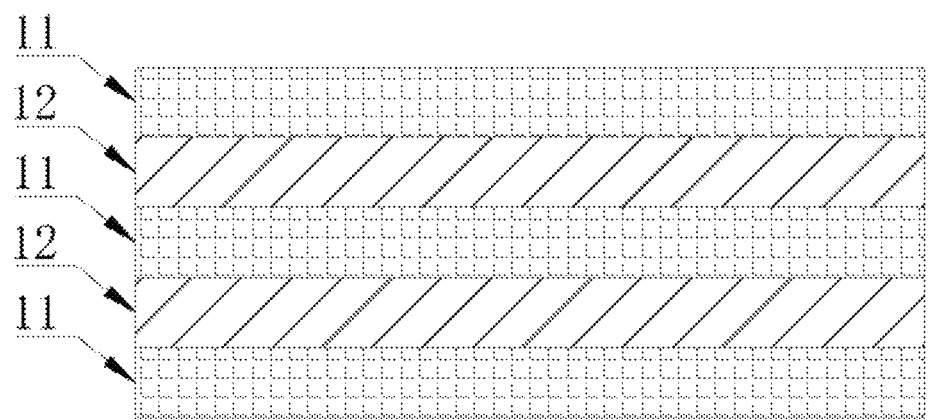

FIG. 7 shows a five-layered composite vibrating diaphragm, wherein the three engineering plastic film layers 11 function as the middle layer, the upper surface layer and the lower surface layer of the composite vibrating diaphragm. The two polyurethane rubber film layers 12 are alternately arranged between the three engineering plastic film layers 11.

The respective film layers of the composite vibrating diaphragm are combined together by way of hot pressing, curtain coating and the like.

Further, the damping adhesive layer and the polyurethane rubber film layer are compounded together. The damping adhesive layer is adhesive by itself, and can be easily combined with the polyurethane rubber film layer.

Of course, the structure of the composite vibrating diaphragm is not limited to the above embodiment and those skilled in the art can adapt the structure according to actual needs.

When the polyurethane rubber film layer is prepared, the polyhydric alcohol, the isocyanate and the chain extender are mixed first, and these substances polymerize to form crude rubber. Then, the crude rubber is subjected to compression molding, injection forming or air pressure forming and the like to prepare the vibrating diaphragm. For example, the vibrating diaphragm is a plane vibrating diaphragm or a corrugated rim vibrating diaphragm.

In an embodiment of the present disclosure, the soft segment portion is composed of a flexible long chain of an oligomer polyhydric alcohol. The soft segment portion can provide flexibility and rebound resilience for the polyurethane rubber. The hard segment portion can provide hardness and rigidity for the polyurethane rubber.

In addition, as the molecular chain of the polyurethane rubber is composed of the hard segment portion and the soft segment portion, the steric hindrance is relatively large when the molecular chain slides, and thus the polyurethane rubber further has proper damping properties. The vibrating diaphragm can effectively reduce noise of the sound-producing apparatus.

The vibrating diaphragm made of the polyurethane rubber not only has a resilient property more excellent than that of the vibrating diaphragm made of an engineering plastic, but also has relatively low distortion.

FIG. 1 is a variation curve of an elongation at break and tensile strength of the polyurethane rubber as a function of a mass content of the hard segment portion according to an embodiment of the present disclosure.

As shown in FIG. 1, a dotted line is a variation curve of an elongation at break of the polyurethane rubber as a function of a content of the hard segment portion. It can be seen that the elongation at break of the polyurethane rubber decreases as the mass content of the hard segment portion increases. A solid line is a variation curve of tensile strength of the polyurethane rubber as a function of a mass content of the hard segment portion. It can be seen that the tensile strength of the polyurethane rubber increases as the content of the hard segment portion increases.

The higher the content of the hard segment portion is, the higher the hardness of the polyurethane rubber is and the larger the tensile strength is. However, if the content of the hard segment portion is too high, the elongation at break of the polyurethane rubber will be very low, causing rapid decrease of foldability and flexibility of the polyurethane rubber.

When the content of the hard segment portion increases, the strength of the polyurethane rubber also increases, while the elongation at break decreases. Consequently, it shows that the vibrating diaphragm becomes brittle and the elasticity of the vibrating diaphragm degrades. In an example, a mass content of the hard segment portion is 2% to 50%. In this range, the polyurethane rubber is relatively high in both tensile strength and elongation at break. The vibrating diaphragm made of the material is relatively high in both flexibility and structural strength. In this range, the elongation at break of the polyurethane rubber is generally high and is over 100%.

The vibrating diaphragm made of the polyurethane rubber in this range is not prone to be subject to yield strain and is not prone to bend irreversibly under action of an external force, and the vibrating diaphragm is better in compliance symmetry. During long-time work, the vibrating diaphragm is not prone to segmented vibration.

Further, a mass content of the hard segment portion is 2% to 30%. In this range, the elongation at break of the polyurethane rubber is over 100% and the tensile strength is over 25 MPa. The vibrating diaphragm made of the polyurethane rubber in this range has a property of resistivity against irreversible bending, and the vibrating diaphragm is more excellent in compliance symmetry.

In an example, the isocyanate is diisocyanate or polyisocyanate.

For example, the isocyanate includes one or more of TDI, MDI, HDI, NDI, PPDI, IPDI, XDI, PADI, HTDI and HMDI. The above materials can be used for synthesizing the polyurethane rubber.

Of course, the isocyanate is not limited to the above embodiment and those skilled in the art can select the isocyanate according to actual needs.

In an example, the chain extender is a polyfunctional low molecular alcohol or amine compound which may react with the isocyanate. The above compound contains reactive hydrogen, and the reactive hydrogen is reacted with an end group prepolymer of isocyanate, such that the molecular chain is diffused and prolonged, and the polyurethane rubber is cured and formed.

For example, the chain extender includes at least one of ethylene glycol, diethylene glycol, 1,2-propylene glycol, dipropylene glycol, 1,4-butanediol (BOD), 1,6-hexanediol (HD), trimethylolpropane (TMP) and castor oil. The above substances can react with isocyanate and polyhydric alcohol, such that the molecular chain can be prolonged. A general formula of the hard segment portion formed by the isocyanate and the chain extender is as previously mentioned.

Of course, the chain extender is not limited to the above embodiment and those skilled in the art can arrange the chain extender according to actual needs.

In an example, the soft segment portion is an oligomer of a polyhydric alcohol compound. For example, the soft segment portion includes at least one of polyester polyol, polyether polyol, polybutadiene polyol, castor oil polyol, tetrahydrofuran-propylene oxide polyol and epoxy resin modified polyol. The above compounds can provide enough elasticity to the polyurethane rubber.

Of course, the polyhydric alcohol is not limited to the above embodiment and those skilled in the art can arrange the polyhydric alcohol according to actual needs.

In an example, a vulcanizer is added into the polyurethane rubber. The vulcanizer is at least one of sulfur, peroxide and isocyanate. The vulcanizer is added into crude rubber. The vulcanizer can crosslink the molecular chains of the polyurethane rubber together. When the dosage of the vulcanizer is too small, a vulcanization reaction is slow, the crosslinking degree is too low, and the strength of the vibrating diaphragm is not enough. With the increase of dosage of the vulcanizer, the crosslinking degree of the polyurethane rubber increases, and the movement of the molecular chain is limited. The elongation at break of the polyurethane rubber will be decreased. For example, 1 to 15 parts of vulcanizer are added into the polyurethane rubber per 100 parts by mass. Preferably, the mass fraction of the vulcanizer is 2 to 10 parts. In this range, the polyurethane rubber is relatively high in both structural strength and elongation at break.

Of course, the vulcanizer is not limited to the above embodiment and those skilled in the art can arrange the vulcanizer according to actual needs.

In an example, a reinforcing agent is added into the polyurethane rubber. For example, the reinforcing agent is powdery inorganic filler. The reinforcing agent is added into crude rubber. The reinforcing agent is added into the polymer after the hard segment portion and the soft segment portion are mixed and are subject to polymerization reaction. The reinforcing agent can improve durability of the material remarkably.

For example, the reinforcing agent includes at least one of carbon black, silicon dioxide, calcium carbonate, barium sulfate, organic montmorillonite and unsaturated metal carboxylates.

Of course, the reinforcing agent is not limited to the above embodiment and those skilled in the art can arrange the reinforcing agent according to actual needs.

In an example, the polyurethane rubber further includes the antiaging agent. For example, at least one antiaging agent is added into the polymer. With the elapse of time, the molecular chains of the polyurethane rubber gradually break and generate dissociative autocatalytic active free radicals to accelerate aging thereof. The antiaging agent can suspend autocatalytic active free radicals generated in polyurethane rubber products. The antiaging agent can improve the aging resistance of the polyurethane rubber and prolong the service life of the polyurethane rubber product remarkably.

For example, the antiaging agent includes at least one of antiaging agent N-445, antiaging agent 246, antiaging agent 4010, antiaging agent SP, antiaging agent RD, antiaging agent ODA, antiaging agent OD and antiaging agent WH-02.

The antiaging agent is added into crude rubber. If the adding amount of the antiaging agent is too small, an effect of prolonging the service life will not be reached. If too much antiaging agent is added, the mechanical property of the polyurethane rubber may degrade as the antiaging agent cannot be inter-dissolved with the polymer and is difficult to disperse uniformly. For example, the adding amount of the antiaging agent in polyurethane rubber per 100 parts by mass is 0.5 to 10 parts. In the proportion range, the antiaging agent can prolong the service life and improve the mechanical property of the polyurethane rubber product.

Further, the adding amount of the antiaging agent in polyurethane rubber per 100 parts by mass is 1 to 5 parts. In the proportion range, the service life of the polyurethane rubber product is longer and the mechanical property thereof is more excellent.

Of course, the antiaging agent is not limited to the above embodiment and those skilled in the art can arrange the antiaging agent according to actual needs.

Compared with the engineering plastic, the polyurethane rubber has relatively low room temperature storage modulus. The polyurethane rubber has the hard segment portions and the soft segment portions. As the strength of the polyurethane rubber can be jointly adjusted by controlling the contents of the hard segment portions and the reinforcing agent, the adjustable range of the hardness thereof is relatively large, for example, the hardness of the polyurethane rubber is 20 A to 95 A. Preferably, the hardness is 20 A to 90 A. Further, the hardness is increased along with the content of the hard segment portions, the rigidity of the molecular chain is improved and the strength of the material is improved.

The room temperature storage modulus of the polyurethane rubber can reach 0.5 MPa to 70 MPa. Preferably, the room temperature storage modulus is 1 MPa to 50 MPa. The higher the strength and hardness of the polysulfide rubber are, the higher the F0 of the vibrating diaphragm is, and the lower the loudness of the sound-producing apparatus is, the worse the low-frequency sound quality is.

Figure 2:
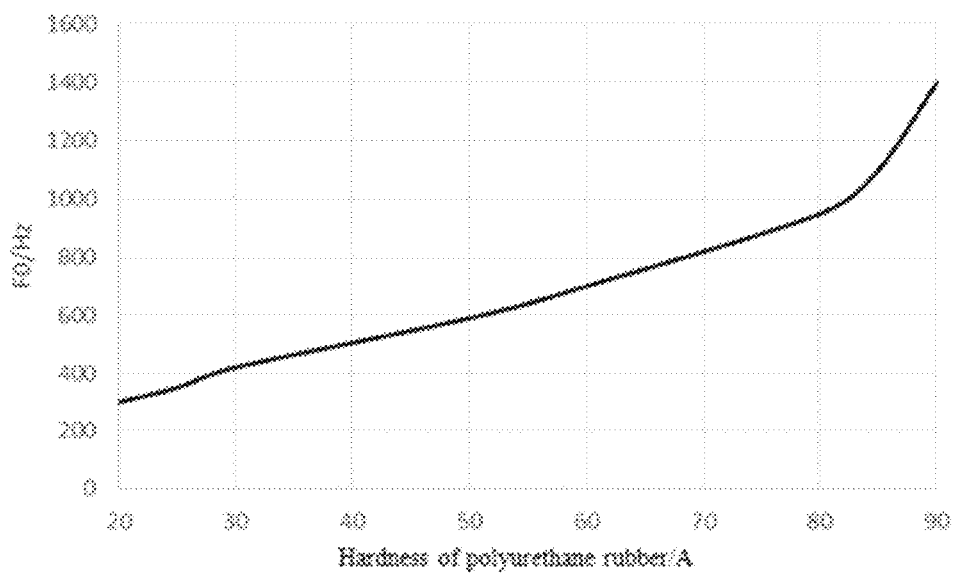
FIG. 2 is a variation curve of F0 of a vibrating diaphragm made of polyurethane rubber as a function of hardness according to an embodiment of the present disclosure.

FIG. 2 is a variation curve of F0 of the vibrating diaphragm made of the polyurethane rubber along with hardness according to an embodiment of the present disclosure.

As shown in the FIG. 2, with the increase of hardness of the polyurethane rubber, F0 of the vibrating diaphragm increases gradually.

F0 of the sound-producing apparatus is in direct proportion to the Young modulus and thickness of the vibrating diaphragm. F0 can be adjusted by changing thickness and Young modulus of the vibrating diaphragm of the sound-producing apparatus. Taking the corrugated rim vibrating diaphragm as an example, the corrugated rim vibrating diaphragm includes a center portion, a corrugated rim part arranged around the center portion and an edge portion arranged around the corrugated rim part. A specific adjusting principle of F0 of the sound-producing apparatus is as follows:

$$F0 = \frac{1}{2\pi}\sqrt{\frac{1}{CmsMms}}$$

Wherein Mms is the equivalent vibrating mass of the sound-producing apparatus, and Cms is the equivalent compliance of the sound-producing apparatus.

$$Cms = \frac{(C_{m1} * C_{m2})}{(C_{m1} + C_{m2})}$$

Wherein $C_{m1}$ is the damper compliance and $C_{m2}$ is the vibrating diaphragm compliance. In a design without a damper, the equivalent compliance of the sound-producing apparatus is the vibrating diaphragm compliance:

$$C_{m2} = \frac{(1-u^3)W^3}{\pi(W+dvc)t^3 E a_1 a_2}$$

Wherein W is the total width of the corrugated rim part of the vibrating diaphragm, t is the thickness of the diaphragm, dvc is the fitting outer diameter of a voice coil fitted to the vibrating diaphragm, E is the Young modulus of the vibrating diaphragm material, and u is the Poisson ratio of the vibrating diaphragm material.

It can be seen that F0 of the sound-producing apparatus is in direct proportion to the Young modulus and thickness of the vibrating diaphragm material, and the Young modulus of the rubber is in direct proportion to its hardness. Thus, F0 of the sound-producing apparatus can be adjusted according to hardness of the polyurethane material.

In order to obtain full low pitch and comfortable hearing feeling, the vibrating diaphragm should have enough rigidity and damping while the sound-producing apparatus has relatively low F0. In an example, the amplitude of F0 is adjusted by adjusting hardness and thickness of the vibrating diaphragm of the sound-producing apparatus. Preferably, the hardness is 20 A to 90 A. The thickness of the vibrating diaphragm of the sound-producing apparatus is 10 μm to 200 μm. Further, the thickness of the vibrating diaphragm is 30 μm to 120 μm. For example, when the vibrating diaphragm is a single polyurethane rubber film layer, the thickness of the polyurethane rubber film layer is 30 μm to 120 μm. When the vibrating diaphragm is the composite vibrating diaphragm, the thickness of the composite vibrating diaphragm is 30 μm to 120 μm. In this range, F0 of the sound-producing apparatus can reach 150 Hz to 1500 Hz, such that the low frequency performance of the sound-producing apparatus is more excellent.

As the polyurethane rubber has a relatively high molecular weight and has the flexible soft segment portions, the brittle temperature thereof ranges from minus 70° C. to minus 20° C. This relatively low brittle temperature enables the vibrating diaphragm of the sound-producing apparatus to maintain high elasticity and good rebound resilience at a relative low temperature. The sound-producing apparatus adopting the vibrating diaphragm has more excellent weather fastness.

Further, the brittle temperature of the polyurethane rubber ranges from minus 65° C. to minus 25° C. In this range, the vibrating diaphragm working in a relatively low temperature environment can keep relatively good rubber elasticity, such that the sound-producing apparatus shows relatively high reliability. Meanwhile, the risk of damaging the vibrating diaphragm of the sound-producing apparatus in the low-temperature environment is reduced, increasing reliability of the vibrating diaphragm.

The higher the damping property of the vibrating diaphragm of the sound-producing apparatus is, the higher of a vibrating system in ability of inhibiting a polarization phenomenon in a vibrating process is, the better the vibrating consistence is, and the fewer the distorting phenomenon of the sound-producing apparatus is. The conventional engineering plastic vibrating diaphragm is low in damp, for example, the loss factor thereof is usually smaller than 0.01. The distorting phenomenon of the sound-producing apparatus of the engineering plastic vibrating diaphragm is relatively severe.

At room temperature, the polyurethane rubber is in the high elastic state, its molecular chain is prone to moving, and the inter-molecular friction force is large. The polyurethane rubber has better damping property, and the loss factor thereof at room temperature is over 0.06. Preferably, the loss factor is over 0.1. Due to the excellent damping property, the vibrating diaphragm has a lower quality factor. The vibrating diaphragm with good damping property can absorb unexpected vibration which may lead to noise. The sound-producing apparatus adopting the vibrating diaphragm can inhibit generation of noise effectively, such that the occurrence of distortion is less frequent.

Figure 3:
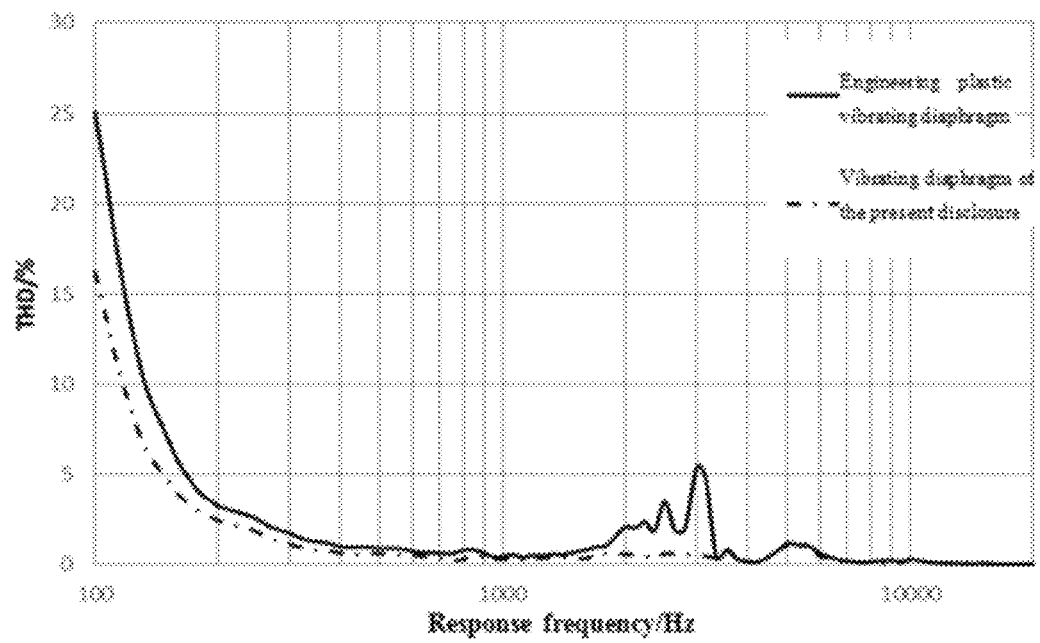
FIG. 3 is variation curve of THD of a vibrating diaphragm according to an embodiment of the present disclosure and PEEK vibrating diaphragm as a function of response frequency.

FIG. 3 is variation curve of THD of the sound-producing apparatus with the vibrating diaphragm according to an embodiment of the present disclosure and the sound-producing apparatus adopting the engineering plastic vibrating diaphragm as a function of response frequency. The solid line is a variation curve of THD of the sound-producing apparatus with the vibrating diaphragm according to an embodiment of the present disclosure along with the response frequency. The dotted line is a variation curve of THD of the sound-producing apparatus adopting the engineering plastic vibrating diaphragm (e.g. the PEEK vibrating diaphragm) as a function of the response frequency.

As shown in FIG. 3, the sound-producing apparatus adopting the vibrating diaphragm provided by the embodiment of the present disclosure has a lower THD (total harmonic distortion) compared with that of sound-producing apparatus adopting the PEEK vibrating diaphragm. It proves that the vibrating diaphragm of the sound-producing apparatus of the embodiment of the present disclosure has a more excellent anti-polarization ability and is more excellent in tone quality.

In an example, the soft segment portion has important influence on elongation at break. It enables the polyurethane rubber to have excellent flexibility, and the elongation at break thereof is over 100%. In this range, the vibration displacement of the vibrating diaphragm is larger and the loudness of the sound-producing apparatus is higher. Further, the vibrating diaphragm is good in reliability and durability.

In addition, the better the flexibility of the vibrating diaphragm is, the greater the elongation at break is, and the higher the ability of the vibrating diaphragm resisting damage is. When the vibrating diaphragm vibrates in large amplitude, its material generates relative large strain, and the vibrating diaphragm material is in the risk of diaphragm fold, diaphragm rupture or diaphragm damage during long-time vibration. The vibrating diaphragm of the sound-producing apparatus taking polyurethane rubber as a base material has good flexibility, and the risk of damaging the vibrating diaphragm is reduced.

Preferably, the elongation at break is greater than 150%. In this range, the vibrating diaphragm is higher in reliability.

Figure 4:
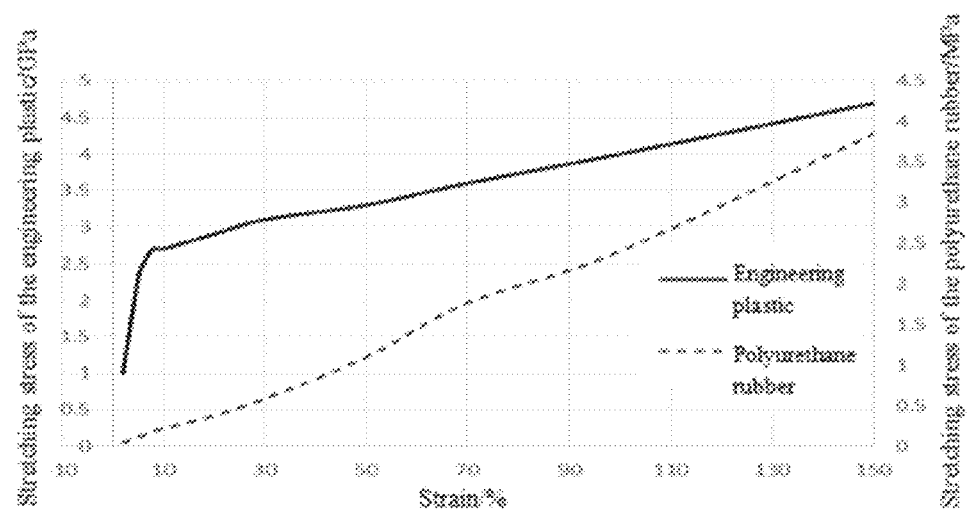
FIG. 4 is a stress-strain curve of a vibrating diaphragm according to an embodiment of the present disclosure and an engineering plastic vibrating diaphragm.

FIG. 4 is a stress-strain curve of the vibrating diaphragm according to an embodiment of the present disclosure and the engineering plastic vibrating diaphragm. The dotted line is a stress-strain curve of the vibrating diaphragm according to an embodiment of the present disclosure; the solid line is a stress-strain curve of the engineering plastic vibrating diaphragm.

As shown in FIG. 4, the engineering plastic vibrating diaphragm forms an obvious yield point which is about 1% to 5% of strain. The vibrating diaphragm of the embodiment provided by the present disclosure is free of yield point. It proves that the vibrating diaphragm provided by the embodiment of the present disclosure has a wider elastic area and excellent resilience compared with the engineering plastic vibrating diaphragm.

Figure 5:
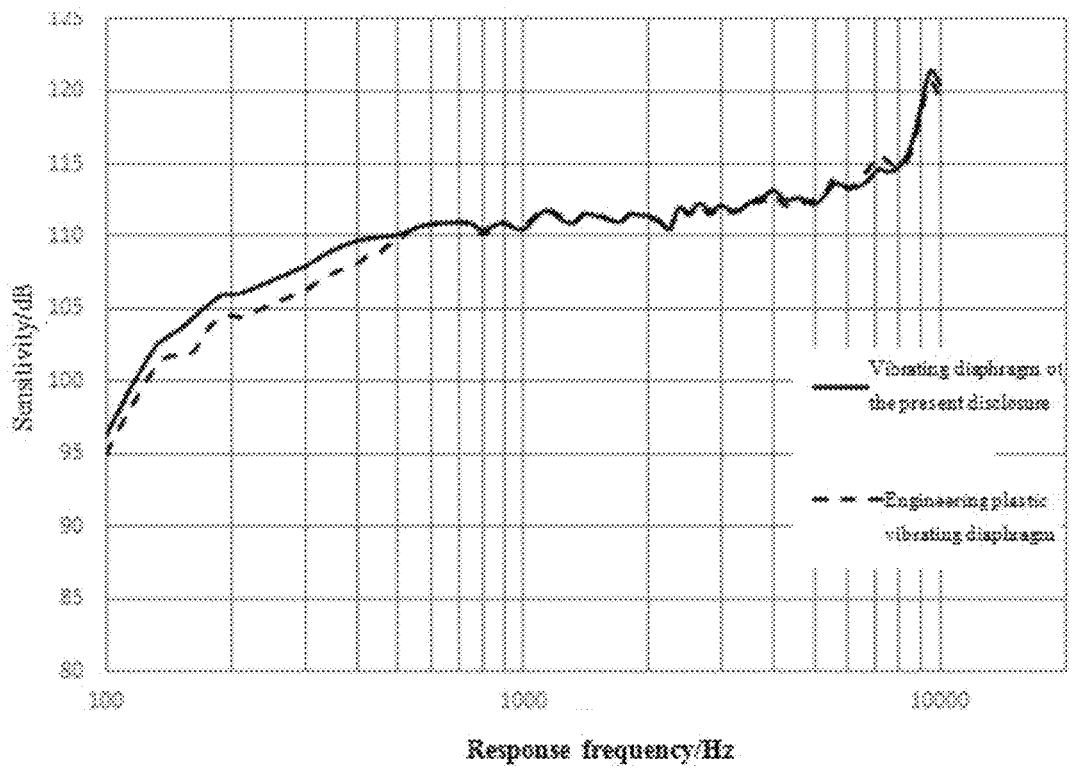
FIG. 5 is a variation curve of sensitivity of a vibrating diaphragm according to an embodiment of the present disclosure and an engineering plastic vibrating diaphragm as a function of response frequency.

FIG. 5 is a variation curve of sensitivity of the vibrating diaphragm according to an embodiment of the present disclosure and the engineering plastic vibrating diaphragm as a function of response frequency, namely, an SPL curve.

The solid line is a variation curve of sensitivity of the vibrating diaphragm of the embodiment of the present disclosure as a function of frequency. The dotted line is a variation curve of sensitivity of the engineering plastic vibrating diaphragm as a function of frequency.

As shown in the FIG. 5, F0 of the sound-producing apparatus adopting the two vibrating diaphragms is substantially the same. However, the sensitivity of the sound-producing apparatus adopting the vibrating diaphragm of the embodiment of the present disclosure is higher than that of the sound-producing apparatus adopting the engineering plastic vibrating diaphragm. That is, the sound-producing apparatus adopting the vibrating diaphragm of the embodiment of the present disclosure is higher in loudness.

According to another embodiment of the present disclosure, provided is a sound-producing apparatus. The sound-producing apparatus includes a magnetic circuit system and a vibrating system matched with the magnetic circuit system. The vibrating system includes the vibrating diaphragm provided by the embodiment of the present disclosure.

The sound-producing apparatus has the characteristics of good durability, small noise and good sound-producing effect.

Although detailed description to some specific embodiments of the present disclosure has been made by way of illustration, those skilled in the art understand that the examples are used for explanation only, rather than to limit the scope of the present disclosure. Those skilled in the art understand that modifications on the embodiment can be made without departing from the scope or the spirit of the present disclosure. The scope of the present disclosure is limited by the appended claims.

The invention claimed is:

1. A vibrating diaphragm of a sound-producing apparatus, wherein the vibrating diaphragm comprises a polyurethane rubber film layer which comprises a block polymer including alternately arranged soft segment portions and hard segment portions, wherein each of the soft segment portions comprises polyhydric alcohol and each of the hard segment portions comprises isocyanate and a chain extender, wherein the polyurethane rubber is represented by a structural formula as follows:

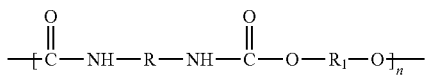

and wherein R is the chain extender, $R_1$ is polyhydric alcohol and n is a natural number.

2. The vibrating diaphragm of claim 1 of the sound-producing apparatus, wherein the isocyanate is selected from the group consisting of diisocyanate and polyisocyanate.

3. The vibrating diaphragm of claim 1 of the sound-producing apparatus, wherein the isocyanate is selected from the group consisting of toluene diisocyanate (TDI), methylene diphenyl diisocyanate (MDI), hexamethylene diisocyanate (HDI), naphthalene diimide (NDI), phenylene diisocyanate (PPDI), isophorone diisocyanate (IPDI), xylylene diisocyanate (XDI), polymethylene polyphenyl isocyanate (PADI), hexahydrotoluylene diisocyanate (HTDI) and hexamethylene diisocyanate (HMDI).

4. The vibrating diaphragm of claim 1 of the sound-producing apparatus, wherein the chain extender is selected from the group consisting of an alcohol compound and an amine compound.

5. The vibrating diaphragm of claim 1 of the sound-producing apparatus, wherein the chain extender is selected from the group consisting of ethylene glycol, diethylene glycol, 1,2-propylene glycol, dipropylene glycol, 1,4-butanediol, 1,6-hexanediol and trimethylolpropane.

6. The vibrating diaphragm of claim 1 of the sound-producing apparatus, wherein the soft segment portion is selected from the group consisting of polyester polyol, polyether polyol, polybutadiene polyol, castor oil polyol, tetrahydrofuran-propylene oxide polyol and epoxy resin modified polyol.

7. The vibrating diaphragm of claim 1 of the sound-producing apparatus, wherein the polyurethane rubber further comprises a vulcanizer which is selected from the group consisting of sulfur, peroxide and isocyanate.

8. The vibrating diaphragm of claim 1 of the sound-producing apparatus, wherein the polyurethane rubber further comprises a reinforcing agent selected from the group consisting of carbon black, silicon dioxide, calcium carbonate, barium sulfate, organic montmorillonite and unsaturated metal carboxylates.

9. The vibrating diaphragm of claim 1 of the sound-producing apparatus, wherein the polyurethane rubber further comprises an antiaging agent selected from the group consisting of antiaging agent N-445, antiaging agent 246, antiaging agent 4010, antiaging agent SP, antiaging agent RD, antiaging agent ODA, antiaging agent OD and antiaging agent WH-02.

10. The vibrating diaphragm of claim 1 of the sound-producing apparatus, wherein a hardness of the polyurethane rubber is 20 A to 90 A and a room temperature storage modulus is 0.5 MPa to 70 MPa.

11. The vibrating diaphragm of claim 1 of the sound-producing apparatus, wherein a brittle temperature of the polyurethane rubber ranges from −70° C. to −20° C., and a loss factor of the polyurethane rubber is greater than or equal to 0.06.

12. The vibrating diaphragm of claim 1 of the sound-producing apparatus, wherein a thickness of the vibrating diaphragm is 20 μm to 50 μm and an elongation at break thereof is greater than or equal to 100%.

13. The vibrating diaphragm of claim 1, wherein a mass content of the hard segment portions in the polyurethane rubber is 2% to 50%.

14. A sound-producing apparatus, comprising a magnetic circuit system and a vibrating system matched with the magnetic circuit system, the vibrating system comprising the vibrating diaphragm of claim 1.

* * * * *